(12) United States Patent
Cui et al.

(10) Patent No.: US 9,618,331 B2
(45) Date of Patent: Apr. 11, 2017

(54) METHOD AND EQUIPMENT BASED ON DETECTING THE POLARIZATION PROPERTY OF A POLARIZATION MAINTAINING FIBER PROBE FOR MEASURING STRUCTURES OF A MICRO PART

(71) Applicant: Harbin Institute Of Technology, Harbin (CN)

(72) Inventors: Jiwen Cui, Harbin (CN); Junying Li, Harbin (CN); Kunpeng Feng, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 15/101,905

(22) PCT Filed: Dec. 31, 2014

(86) PCT No.: PCT/CN2014/095838
§ 371 (c)(1),
(2) Date: Jun. 4, 2016

(87) PCT Pub. No.: WO2015/139505
PCT Pub. Date: Sep. 24, 2015

(65) Prior Publication Data
US 2016/0305764 A1  Oct. 20, 2016

(30) Foreign Application Priority Data

Mar. 20, 2014 (CN) .......................... 2014 1 0118360
Mar. 20, 2014 (CN) .......................... 2014 1 0118921
(Continued)

(51) Int. Cl.
*G01J 4/00* (2006.01)
*G01B 11/00* (2006.01)
(Continued)

(52) U.S. Cl.
CPC ............ *G01B 11/007* (2013.01); *G01B 5/012* (2013.01); *G01B 11/18* (2013.01)

(58) Field of Classification Search
CPC .................................. G01B 11/18; G01J 4/00
(Continued)

(56) References Cited

U.S. PATENT DOCUMENTS

| 6,568,242 | B2 * | 5/2003 | Nai | ......................... | G05B 19/19 |
|  |  |  |  |  | 33/502 |
| 2006/0006317 | A1 * | 1/2006 | Itoh | ......................... | B82Y 20/00 |
|  |  |  |  |  | 250/227.11 |

FOREIGN PATENT DOCUMENTS

WO     2005017585 A1     2/2005

OTHER PUBLICATIONS

The International Search Report and Written Opinion for PCT Application No. PCT/CN2014/095838 mailed Mar. 16, 2015.

\* cited by examiner

*Primary Examiner* — Roy M Punnoose
(74) *Attorney, Agent, or Firm* — Troutman Sanders LLP; Ryan A. Schneider; Christopher C. Close, Jr.

(57) ABSTRACT

A method and equipment based on detecting the polarization property of a polarization maintaining fiber (PMF) probe for measuring structures of a micro part are provided. The provided method relates to how to accomplish measuring structures of a micro part by transforming two or three-dimensional contact displacements into polarization property changes of the PMF probe, and how to reconstruct the structure geometry of a micro part. The provided equipment can be used to bring the spherical tip of the PMF probe into contact with a micro part, to determine coordinates of contact points, and to reconstruct the structure geometry of a micro part. The provided method and equipment feature
(Continued)

high sensitivity, low probing force, high inspecting aspect ratio and immunity to environment interference.

22 Claims, 9 Drawing Sheets

(30) Foreign Application Priority Data

Mar. 20, 2014 (CN) .......................... 2014 1 0118923
Mar. 20, 2014 (CN) .......................... 2014 1 0118966
Mar. 20, 2014 (CN) .......................... 2014 1 0118970

(51) Int. Cl.
*G01B 5/012* (2006.01)
*G01B 11/16* (2006.01)

(58) Field of Classification Search
USPC ........................................................ 356/367
See application file for complete search history.

METHOD AND EQUIPMENT BASED ON DETECTING THE POLARIZATION PROPERTY OF A POLARIZATION MAINTAINING FIBER PROBE FOR MEASURING STRUCTURES OF A MICRO PART

FIELD OF INVENTION

The invention relates to a method based on detecting the polarization property of a PMF probe for measuring structures of a micro part, wherein structure measurement of a micro part is accomplished by transforming two or three-dimensional contact displacements into polarization property changes of the PMF probe and the structure geometry of a micro part is reconstructed. The invention also relates to an equipment based on detecting the polarization property of a PMF probe for measuring structures of a micro part, and the equipment consists of a coordinate measuring instrument system, a probing system and a measurement computer, wherein the spherical tip of the PMF probe is brought into contact with a micro part, and contact points of a micro part can be calculated from coordinates of the PMF probe relative to the coordinate measuring instrument system and contact displacements of the spherical tip of the PMF probe relative to its zero-force position measured directly using the probing system.

DESCRIPTION OF PRIOR ART

With fast development of manufacturing technologies, more and more structures of micro parts with dimensions of 0.1~1 mm and aspect ratios of more than 10:1 are now used in an increasing number of applications, including ink-jet printer nozzles, microgroove arrays in aerospace propulsion engines, cooling vents in turbine blades, diesel fuel injection holes and devices of binary optics, which present challenges to the measurement precision and inspecting depth of existing probing systems. Therefore, it is of great significance to develop a precise probing system for measuring structures of a micro part, especially for one with a miniaturized size and high inspecting aspect ratio.

Much work has been done on this particular aspect in recent years. For example, Gaoliang Dai, Sebastian Bütefisch, Frank Pohlenz and Hans-Ulrich Danzebrink et al. invented a small silicon probe based on MEMS fabrication process, which consists of a silicon chip membrane and integrated piezoresistive elements. The piezoresistive elements are etched onto the silicon membrane to detect three-dimensional deformation, and the stylus is attached to the center of the silicon membrane. The probe tip is less than 300 µm in diameter, and the probing force achieved by the membrane system is about 100 mN. However, the fabrication process of their probe is complex and the production cost is high.

Owing to the low production cost, immune to electromagnetic interference and interruption and compact in size, more and more fiber probes have been developed in recent year for dimensional measurement. H. Schwenke, F. Wäldele, C. Weiskirch, H. Kunzmann invented a fiber probe with a fiber spherical tip to backscatter light. The stylus of this probe is 15 µm in diameter, and the spherical tip is 25 µm in diameter. The laser beam enters through the fiber and lights the fiber spherical tip. The back scattered light is imaged using a CCD camera, and contact displacements in xy-direction is thus transformed into movements of the center of the light spot in a CCD camera. This probe can further be extended to a three-dimensional system by attaching a fiber sphere to the stylus and the image of the spherical tip is reflected on a second CCD camera using a mirror. But due to shadowing effect, a CCD camera cannot obtain enough light energy to create an image, and the inspecting depth achievable with this probe is thus limited.

Jiubin Tan and Jiwen Cui invented a spherical coupling optical fiber probe. The spherical coupling optical fiber probe consists of incident fiber, effluent fiber and a spherical coupler combining double fibers fixed on the probe tip. The laser beam passes through the coupling lens to enter the coupler and comes out from the effluent fiber in the reverse direction. The return light passes through an object lens and is captured by a CCD camera with an objective lens. This probe extends the range of inspecting depth, but how to realize three-dimensional measurement and fabricate a smaller fiber coupler with a high coupling efficiency is still an open issue.

To further extend the inspecting depth of micro parts, Jiubin Tan, Fei Wang and Jiwen Cui invented a fiber probe based on micro focal-length collimation. A cylindrical lens with a focal length in micrometers is formed by a thin glass fiber stylus without coating. A parallel light source is focused by an objective lens to form a point light source. Then, the point light source is collimated by the cylindrical lens and the image fringe is acquired by a linear or area array CCD camera. This probing system has a displacement magnification of more than 10,000 because the focal length of the fiber cylindrical lens is very short. Light propagates outside high aspect ratio structures of a micro part and the inspecting depth can thus be extended. However, limitations of this approach include that the z-displacement is detected by buckling, which is not stable and may be hard to achieve true three-dimensional measurements.

Above all, fiber probes have been widely applied in measuring structures of a micro part and become more suitable for its optical and mechanical features of optical conductivity, easy miniaturization and low probing force. Different methods have been designed for sensing contact displacements of fiber probes, and the followings are some of their drawbacks:
1. The inspecting depth is restricted by shadow effect. For some probes based on light backscatter, the emission light is easily obstructed or reflected by the sidewall, and a large range of the emission angle allows few particles of light to reach the photo-detector.
2. Bulk size of the probing system can hardly meet the requirement of the probing space and limits its application for measuring structures on a complex-shaped micro part with limited probing space.
3. Absence of multi-dimensional tactile sense and multi-dimension-decoupling capacity makes the measurement process complex and time-consuming. A real-time application can hardly be achieved.
4. The inspecting resolutions of fiber probes are hard to be further enhanced. Most of fiber probes have sub-micrometer resolutions only. The displacement sensitivities are too low to achieve precise measurement.

SUMMARY OF INVENTION

One purpose of the present invention is to propose a method based on detecting the polarization property of a PMF probe for measuring structures of a micro part, which consists of following steps:
Step 1. Providing a PMF probe, which comprises a spherical tip and a PMF stylus. The PMF stylus is cantilevered at one end and with the spherical tip fixed on the other end. The PMF stylus of the PMF probe contains one or more PMFs;

Step 2. Providing a probing system, which consists of the PMF probe mentioned in step 1, an optical path, a polarization demodulate unit and a signal processing unit. When a micro part is measured, the spherical tip of the PMF probe is brought into contact with a micro part and the polarization maintaining property of PMFs of the PMF stylus change accordingly. The optical path supplies the PMF probe with energy and ensures the sensing signal containing polarization property changes of PMFs of the PMF stylus can reach the polarization demodulate unit. The polarization demodulate unit and the signal processing unit detects and processes the sensing signal, transforms it into polarization property changes of PMFs of the PMF stylus, and then calculates contact displacements of the spherical tip of the PMF probe relative to its zero-force position;

Step 3. Combining the probing system mentioned in step 2 with a coordinate measuring instrument system to form an equipment based on detecting the polarization property of a PMF probe for measuring structures of a micro part, contact displacements of the spherical tip of the PMF probe and coordinates of the PMF probe relative to the coordinate measuring instrument system are acquired in real time and are processed by a measurement computer, wherein coordinates of contact points can be calculated from coordinates of the PMF probe relative to the coordinate measuring instrument system and contact displacements of the spherical tip of the PMF probe relative to its zero-force position measured directly using the probing system;

Step 4. A micro part being measured is fastened to the measurement table of the equipment based on detecting the polarization property of a PMF probe for measuring structures of a micro part mentioned in step 3. The motion of the measurement table and the PMF probe fixed on the sleeve of the equipment is controlled by manual operation or a measurement program. Relative motion between the PMF probe and a micro part occurs and the motion track is accurately designed to bring the spherical tip of the PMF probe into contact with a certain point of a micro part. Coordinates of the contact point can be calculated in the measurement computer mentioned in step 3;

Step 5. Repeat the measurement process in step 4 to obtain coordinates of more contact points and the structure geometry of a micro part being measured can be reconstructed from coordinates of these contact points.

The second purpose of the present invention is to propose an equipment based on detecting the polarization property of a PMF probe for measuring structures of a micro part.

According to the second aspect of the invention, the equipment based on detecting the polarization property of a PMF probe for measuring structures of a micro part consists of a coordinate measuring instrument system which is used to implement the whole measuring process and determine accurate coordinates of the PMF probe relative to the coordinate measuring instrument, a probing system which makes the PMF probe working, demodulates the sensing signal and extracts contact displacements of the spherical tip of the PMF probe, a measurement computer which receives results of the coordinate measuring instrument system and the probing system, calculates coordinates of contact points of a micro part being measured using according results above, plans measuring process and sends motion signal to a Computer Numerical Control (CNC) controller of the coordinate measuring instrument system.

The coordinate measuring instrument system is of standard design, which consists of a crosspiece, a sleeve adjustable in the X and Z direction, a measurement table movable in the Y direction, an instrument basement, a XYZ-counter, a CNC controller. The sleeve and the crosspiece, the crosspiece and the instrument basement, the measurement table and the instrument basement are linked with mechanical structures, respectively. The sleeve and the XYZ-counter, the measurement table and the XYZ-counter, the instrument basement and the CNC controller, the XYZ-counter and the measurement computer, and the CNC controller and the measurement computer are linked with electric cable, respectively.

The equipment based on detecting the polarization property of a PMF probe for measuring structures of a micro part features a probing system, which can be a system comprises PMF probe consisting of a PMF stylus made of one or more PMFs and a spherical tip, a light source, an optical circulator, a multi-channel optical switch, a PMF pigtail bundle consisting of one or more PMFs and the quantity of the PMFs is determined by that of the PMF stylus, a polarization demodulate unit and a signal processing unit. The PMF probe is fixed on the sleeve. The light source and the optical circulator, the optical circulator and the multi-channel optical switch, the optical circulator and the polarization demodulate unit are linked with single PMF, respectively; the multi-channel optical switch and the PMF stylus of the PMF probe are linked with the PMF pigtail bundle. The polarization demodulate unit and the signal processing unit, the multi-channel optical switch and the measurement computer, and the signal processing unit and the measurement computer are linked with electric cable, respectively.

The equipment based on detecting the polarization property of a PMF probe for measuring structures of a micro part features a probing system, which can also be a system comprises a PMF probe consisting of a PMF stylus made of two PMFs and a spherical tip, a light source, a double PMFs pigtail bundle consisting of an incident PMF and an effluent PMF, a polarization demodulate unit and a signal processing unit. The PMF probe is fixed on the sleeve. The double PMFs pigtail bundle is linked to the PMF stylus of the PMF probe in one end, and in the other end, the incident PMF of the double PMFs pigtail bundle is connected with the light source, and the effluent PMF of the double PMFs pigtail bundle is connected with the polarization demodulate unit. The polarization demodulate unit and the signal processing unit and the signal processing unit and the measurement computer are linked with electric cable, respectively.

The light source is an adjustable linear polarization laser which consists of a laser source and a rotating linear polarizer module. A linearly polarized light in any direction can be achieved by adjusting the polarization direction of the rotating linear polarizer module. The polarization direction of the linearly polarized light of the light source is aligned to the angular bisector of the fast axis and slow axis, or the fast axis, or the slow axis, or a particular direction of PMFs of the PMF stylus.

The polarization demodulate unit can be a polarimeter which has an optical input port and an electric output port.

The polarization demodulate unit can be a power detecting unit which consists of a polarization beam splitter with an optical input port and a multi-channel optical power measuring device with an electric output port.

The arrangement of PMFs of the PMF stylus is of particular design, and fixed by adhesive. The spherical tip which is fabricated by electric discharge machining, oxyhydrogen flame machining or micro ball assembly technique, is fixed on one end of the PMF stylus to be the PMF probe. The diameter of PMFs used to fabricate the PMF stylus is 80~125 μm, the diameter of the PMF stylus is 80 μm~600 the diameter ratio of the spherical tip to the PMF stylus is normally 1.2~1.5, the PMF stylus can be 3~10 mm long.

The PMF stylus can be a section of single PMF. The core of the PMF that is the center of the PMF stylus coincides with the origin point of horizontal and vertical axes. The fast axis of the PMF is synclastic with the positive direction of the horizontal axis.

The PMF stylus can be a section of dual-synclastic-PMFs which consists of the first PMF and the second PMF. The center of the PMF stylus coincides with the origin point of horizontal and vertical axes. The core of the first PMF and the core of the second PMF are located on the negative and positive direction of the horizontal axis with a distance of d to the origin point of horizontal and vertical axes. The fast axes of the first PMF and the second PMF are synclastic with the positive direction of the horizontal axis.

The PMF stylus can be a section of dual-orthometric-PMFs which consists of the first PMF and the second PMF. The center of the PMF stylus coincides with the origin point of horizontal and vertical axes. The cores of the first PMF and the second PMF are located on the negative and positive direction of the horizontal axis with a distance of d to the origin point of horizontal and vertical axes. The fast axis of the first PMF and the slow axis of the second PMF are synclastic with the positive direction of the horizontal axis.

The PMF stylus can be a section of square-synclastic-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225° and 315° to the positive direction of the horizontal axis, respectively. The fast axes of the first PMF, the second PMF, the third PMF and the fourth PMF are synclastic with the positive direction of the horizontal axis.

The PMF stylus can be a section of square-orthometric-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225° and 315° to the positive direction of the horizontal axis, respectively. The fast axis of the first PMF, the slow axis of the second PMF, the fast axis of the third PMF and the slow axis of the fourth PMF are synclastic with the positive direction of the horizontal axis.

The PMF stylus can be a section of square-semi-synclastic-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225° and 315° to the positive direction of the horizontal axis, respectively. The slow axes of the first PMF and the second PMF, the fast axes of the third PMF and the fourth PMF are synclastic with the positive direction of the horizontal axis.

The PMF stylus can be a section of rhombic-synclastic-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively. The fast axes of the first PMF, the second PMF, the third PMF and the fourth PMF are synclastic with the positive direction of the horizontal axis.

The PMF stylus can be a section of rhombic-orthometric-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively. The slow axis of the first PMF, the fast axis of the second PMF, the slow axis of the third PMF and the fast axis of the fourth PMF are synclastic with the positive direction of the horizontal axis.

The PMF stylus can be a section of rhombic-semi-synclastic-PMFs which consists of the first PMF, the second PMF, the third PMF and the fourth PMF. The center of the PMF stylus coincides with the origin point of horizontal and vertical axes. The cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively. The slow axis of the first PMF, the fast axis of the second PMF, the fast axis of the third PMF and the slow axis of the fourth PMF are synclastic with the positive direction of the horizontal axis.

The PMF can be a "Panda" style PMF, or a "Bow-Tie" style PMF, or an elliptical-clad style PMF, or an elliptical-core style PMF.

The present invention has the following advantages:

(1). Three-dimensional measurement capability. Thanks to the difference of refractive index between the fast axis and slow axis of PMFs of the PMF stylus, there are two orthogonal polarization modes propagating in PMFs of the PMF stylus, and polarization property changes caused by radial contact displacements and axial contact displacements of the spherical tip of the PMF probe have significant differences. When PMFs of the PMF stylus is bended by radial contact displacements of the spherical tip, the refractive index changes cause energy exchanges and phase changes between the two orthogonal polarization modes propagating in the PMF; when the PMF is compressed by axial contact displacements of the spherical tip, no energy exchanges between these two orthogonal polarization modes occur, but phase changes between these two orthogonal polarization modes occur. By demodulating the polarization property changes of the PMF probe, three-dimensional measurement can be achieved.

(2) High inspecting aspect ratio. The inspecting depth is not affected by the shadowing effect by guiding optical signals propagating in the probe and separating the signal processing device from the probe. The minimum dimension of structures of a micro part to be measured can go up to 100 μm for the limit imposed by the spherical tip of the PMF stylus, and the inspecting aspect ratio is up to 100:1.

(3) Very low probing force. The contact measurement is achieved by deflecting a thin optical fiber. The probing force is less than several tens of mN.

(4) Immunity to environment interference. The PMF probe is immune to electromagnetic interference.

BRIEF DESCRIPTION OF ACCOMPANYING DRAWINGS

DESCRIPTION OF PREFERRED EMBODIMENTS

Figure 1:
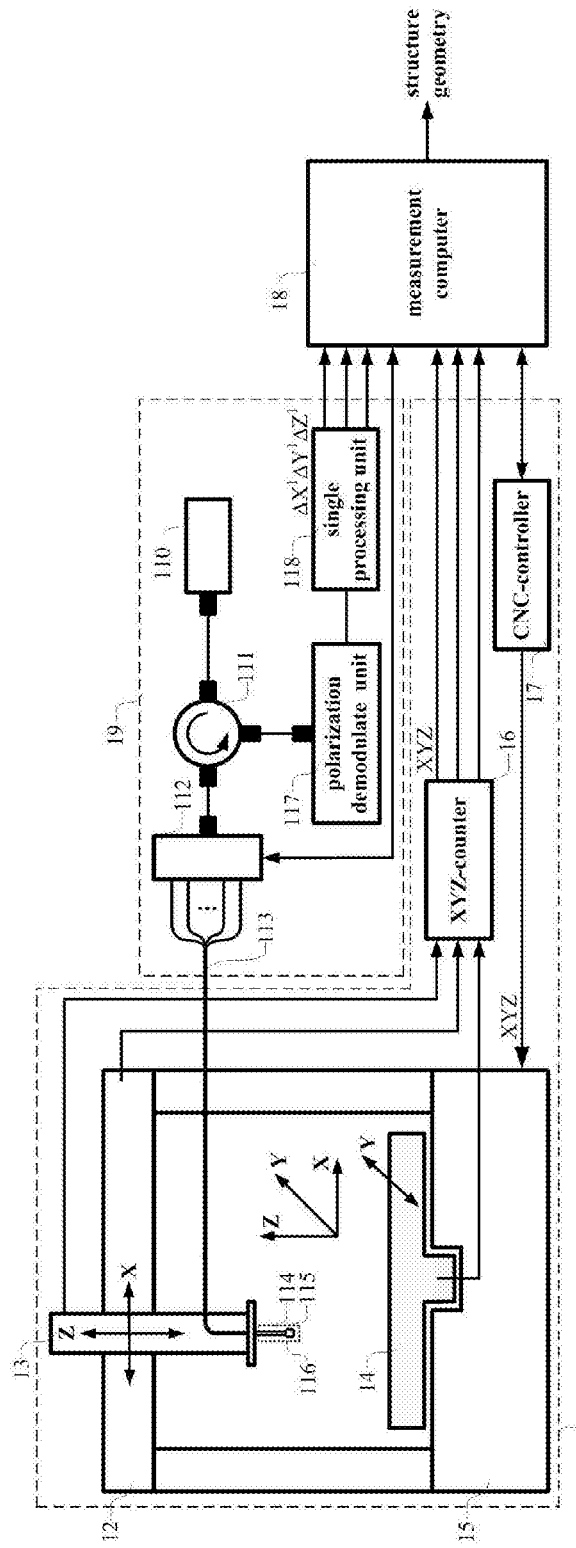
FIG. 1 is schematic illustration of the coordinate measuring equipment based on polarization maintaining fiber probe.

A method based on detecting the polarization property of a PMF probe for measuring structures of a micro part, which consists of following steps:

Step 1. Providing a PMF probe, which comprises a spherical tip and a PMF stylus. The PMF stylus is cantilevered at one end and with the spherical tip fixed on the other end. The PMF stylus of the PMF probe contains one or more PMFs;

In step 1, the PMF stylus which consists of one or more PMFs with a spherical tip in the end is served as a PMF probe. The incident light of the PMF probe is linearly polarized light. When the spherical tip of the PMF probe is subjected to a radial contact displacement, the PMF stylus suffers a corresponding stress caused by the radial contact displacement of the spherical tip. This stress induces refractive index changes of the fast axis and slow axis of PMFs of the PMF stylus, and this means changes of transmission constants of two orthogonal polarization modes propagating in PMFs of the PMF stylus. The changes of transmission constants break the polarization maintaining property of PMFs of the PMF stylus and cause energy exchanges and phase changes between the two orthogonal polarization modes propagating in PMFs of the PMF stylus which are generated by the incident linearly polarized light. As a result, the ellipticity and azimuth of the reflected light of the PMF probe change with the radial contact displacement of the spherical tip of the PMF probe. When the spherical tip of PMF probe is subjected to an axial contact displacement, the PMF stylus is compressed by the axial contact displacement, refractive indices of the fast axis and slow axis of PMFs of the PMF stylus and propagation length of the incident linearly polarized light in PMFs of the PMF stylus both change accordingly, and this means that the equivalent optical path length of the incident linearly polarized light changes. The transmission constant changes of two orthogonal polarization modes propagating in PMFs of PMF stylus caused by the refractive index changes are in common-mode, so no energy exchanges between these two orthogonal polarization modes occur, but phase between these two orthogonal polarization modes changes. As a result, the azimuth of the reflected light of the PMF probe changes with the axial contact displacement of the spherical tip of the PMF probe.

Step 2. Providing a probing system, which consists of the PMF probe mentioned in step 1, an optical path, a polarization demodulate unit and a signal processing unit. When a micro part is measured, the spherical tip of the PMF probe is brought into contact with a micro part and the polarization maintaining property of PMFs of the PMF stylus changes accordingly. The optical path supplies the PMF probe with energy and ensures the sensing signal containing polarization property changes of PMFs of the PMF stylus can reach the polarization demodulate unit. The polarization demodulate unit and the signal processing unit detects and processes the sensing signal, transforms it into polarization property changes of PMFs of the PMF stylus, and then calculates contact displacements of the spherical tip of the PMF probe relative to its zero-force position;

The probing system can be embodied in four ways:

The polarization demodulate unit is a polarimeter. An incident linearly polarized light from the light source enters into PMFs of the PMF stylus in a time-division-multiplexing way, and the light is reflected by the spherical tip of the PMF probe, then the reflected light propagates back along the same way to the polarmeter. The polarization of the reflected light changes accordingly when the spherical tip of PMF probe is subjected to contact displacements. Radial contact displacements have effects on the ellipticity and azimuth of the reflected light, and axial contact displacements have effect on the azimuth of the reflected light. Therefore, radial contact displacements of the spherical tip of the PMF probe relative to its zero-force position can be calculated by demodulating changes of the ellipticity of the reflected light through the polarimeter; axial contact displacements of the spherical tip of the PMF probe relative to its zero-force position can be calculated by demodulating changes of the azimuth of polarization of the reflected light through the polarimeter and eliminating changes of the azimuth caused by radial contact displacements. The probing system has a three-dimensional decoupling capability.

The polarization demodulate unit is a power detecting unit which consists of a polarization beam splitter and multi-channel optical power measuring device. An incident linearly polarized light from the light source enters into PMFs of the PMF stylus in a time-division-multiplexing way, and the light is reflected by the spherical tip of PMF probe, then the reflected light propagates back along the way to the power detecting unit. The reflected light is split by the polarization beam splitter into lights of the fast axis and slow axis, and then received by the multi-channel optical power measuring device for power detecting. The polarization of the reflected light changes accordingly when the spherical tip of PMF probe is subjected to contact displacements. Radial contact displacements have effects on the ellipticity and azimuth of the reflected light, and an energy exchange between the lights of the fast axis and slow axis will be detected. Therefore, radial contact displacements of the spherical tip of the PMF probe relative to its zero-force position can be calculated by demodulating the optical power of lights separated by the polarization beam splitter through the multi-channel optical power measuring device. The probing system has a two-dimensional decoupling capability.

The polarization demodulate unit is a polarimeter. The linearly polarized light from the light source enters into the PMF stylus through the incidence fiber of the double PMF pigtail bundle, and the light is reflected by the spherical tip of the PMF probe, and then the reflected light is sent into the polarmeter through the effluent fiber of the double PMF pigtail bundle. The polarization of the reflected light changes accordingly when the spherical tip of the PMF probe is subjected to contact displacements. Radial contact displacements have effects on the ellipticity and azimuth of the reflected light, and axial contact displacements have effect on the azimuth of the reflected light. Therefore, radial contact displacements of the spherical tip of the PMF probe relative to its zero-force position can be calculated by demodulating changes of the ellipticity of the reflected light through the polarimeter; axial contact displacements of the spherical tip of the PMF probe relative to its zero-force position can be calculated by demodulating changes of the azimuth of polarization of the reflected light through the polarimeter and eliminating changes of the azimuth caused by radial contact displacements. The probing system has a three-dimensional decoupling capability.

The polarization demodulate unit is a power detecting unit which consists of a polarization beam splitter and multi-channel optical power measuring device. The linearly polarized light from the light source enters into the PMF stylus through the incidence fiber of the double PMF pigtail bundle, and the light is reflected by the spherical tip of the PMF probe, and then the reflected light is sent into the power detecting unit through the effluent fiber of the double PMF pigtail bundle. The reflected light is split by the polarization beam splitter into lights of the fast axis and slow axis, and then received by the multi-channel optical power measuring device for power detecting. The polarization of the reflected light changes accordingly when the spherical tip of the PMF probe is subjected to contact displacements. The radial contact displacements have effects on the ellipticity and azimuth of the reflected light, and an energy exchange between the lights of the fast axis and slow axis will be detected. Therefore, radial contact displacements of the spherical tip of the PMF probe relative to its zero-force position can be calculated by demodulating the optical power of lights separated by the polarization beam splitter through the multi-channel optical power measuring device. The probing system has a two-dimensional decoupling capability.

Step 3. Combining the probing system mentioned in step 2 with a coordinate measuring instrument system to form an equipment based on detecting the polarization property of a PMF probe for measuring structures of a micro part, contact displacements of the spherical tip of the PMF probe and coordinates of the PMF probe relative to the coordinate measuring instrument system are acquired in real time and are processed by a measurement computer, wherein coordinates of contact points can be calculated from coordinates of the PMF probe relative to the coordinate measuring instrument system and contact displacements of the spherical tip of the PMF probe relative to its zero-force position measured directly using the probing system;

In step 3, a type of equipment based on detecting the polarization property of a PMF probe for measuring structures of a micro part is formed, in which coordinates of the coordinate measuring instrument system and changes of the probing system will be recorded in real time with a high speed. The probing system is used as a trigger and the coordinate measuring instrument system offers a precise three-dimensional movement and feedback. The movement of the coordinate measuring instrument system will be stopped as soon as the spherical tip of the PMF probe contacts a micro part. Coordinates of contact points can be calculated using a program embedded within the measurement computer.

Step 4. A micro part being measured is fastened to the measurement table of the equipment based on detecting the polarization property of a PMF probe for measuring structures of a micro part mentioned in step 3. The motion of the measurement table and the PMF probe fixed on the sleeve of the equipment is controlled by manual operation or a measurement program. Relative motion between the PMF probe and a micro part occurs and the motion track is accurately designed to bring the spherical tip of the PMF probe into contact with a certain point of a micro part. Coordinates of the contact point can be calculated in the measurement computer mentioned in step 3;

In step 4, coordinates of a contact point of a micro part can be manually or automatically acquired using the coordinate measurement method mentioned in step 3.

Step 5. Repeat the measurement process in step 4 to obtain coordinates of more contact points and the structure geometry of a micro part being measured can be reconstructed from coordinates of these contact points.

In step 5, the coordinates of contact points of a micro part are acquired using the measurement process mentioned in step 4 and the structure geometry of a micro part being measured can be reconstructed according to these contact points.

Figure 2:
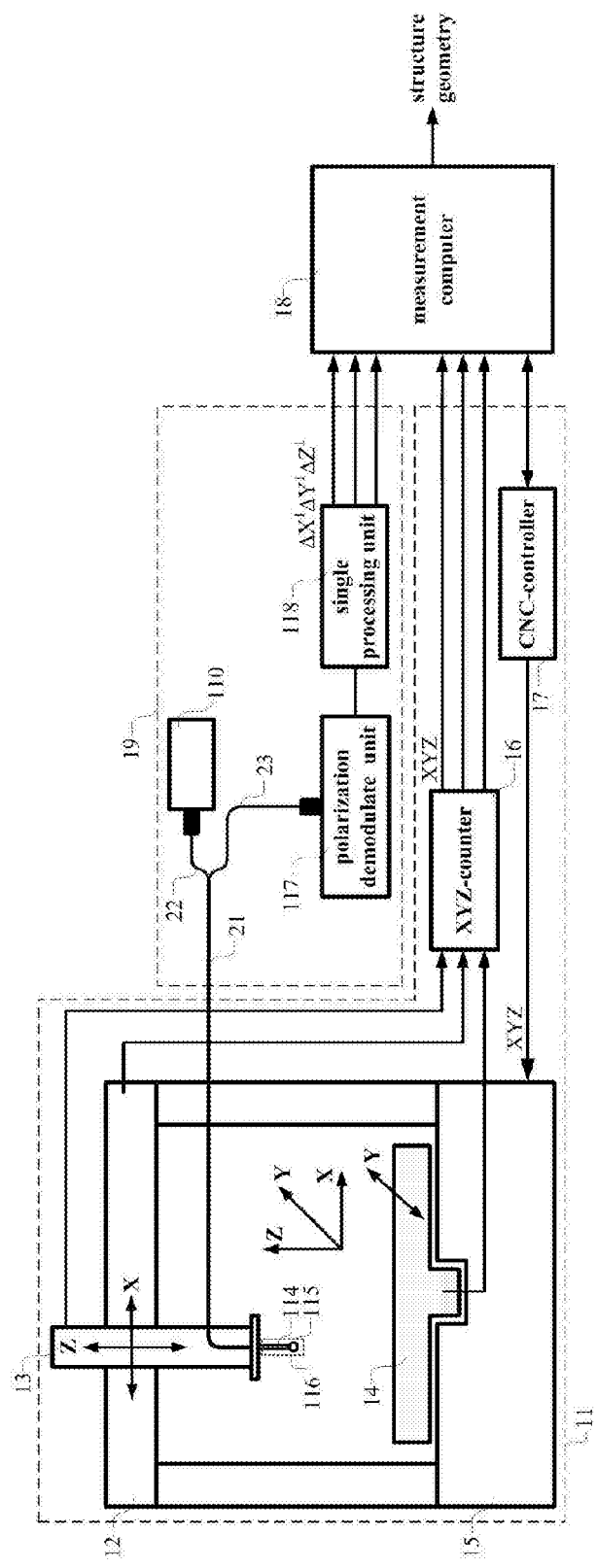
FIG. 2 is the second embodiment of the probing system.

According to the second purpose of the present invention, an equipment based on detecting the polarization property of a PMF probe for measuring structures of a micro part can be set up in the following ways:

As shown in FIG. 1 and FIG. 2, the equipment based on detecting the polarization property of a PMF probe for measuring structures of a micro part consists of a coordinate measuring instrument system 11, a probing system 19, and a measurement computer 18.

The coordinate measuring instrument system 11 consists a crosspiece 12, a sleeve 13 adjustable in the X and Z direction, a measurement table 14 movable in the Y direction, an instrument basement 15, a XYZ-counter 16, a CNC controller 17. The sleeve 13 and the crosspiece 12, the crosspiece 12 and the instrument basement 15, the measurement table 14 and the instrument basement 15 are linked with mechanical structures, respectively. The crosspiece 12 supports the sleeve 13. The instrument basement 15 supports the crosspiece 12 and the measurement table 14. The instrument basement 15 drives the measurement table 14 directly and the sleeve 13 indirectly through the crosspiece 12. A PMF probe 116 for sensing contact displacement is fixed on the sleeve 13 and can be adjustable in the X and Z direction. A micro part being measured is fastened to the measurement table 14 and can be movable in the Y direction. The sleeve 13 and XYZ-counter 16, the measurement table 14 and the XYZ-counter 16, the instrument basement 15 and the CNC controller 17, the XYZ-counter 16 and the measurement computer 18, and the CNC controller 17 and the measurement computer 18 are linked with electric cable, respectively. The XYZ-counter 16 is used to determine the coordinate values X, Y, Z of the PMF probe 116 relative to the coordinate measuring instrument system 11, and send the coordinate values to measurement computer 18. The CNC controller 17 receives the signal from the measurement computer 18, and controls the motion of sleeve 13 and the measurement table 14. Relative motion between the PMF probe 116 and the micro part is controlled by the CNC-controller 17 to implement CNC operation and measurement processes, and the motion track is accurately designed to bring the spherical tip 115 of the PMF probe 116 come into contact with a certain point of the micro part.

As shown in FIG. 1, the probing system 19 can be a system which consists of a PMF probe 116, a light source 110, an optical circulator 111, a multi-channel optical switch 112, a PMF pigtail bundle 113, a polarization demodulate unit 117 and a signal processing unit 118. The PMF probe 116 comprises a PMF stylus 114 and a spherical tip 115, the PMF stylus 114 consists of one or more PMFs, and the spherical tip 115 is fixed on one end of the PMF stylus 114. The PMF pigtail bundle 113 consists of one or more PMFs, and the quantity of PMFs is determined by that of the PMF stylus 114. The PMF pigtail bundle 113 is used for connecting the multi-channel optical switch 112 and the PMF stylus 114. The light source 110 and the optical circulator 111, the optical circulator 111 and the multi-channel optical switch 112, the optical circulator 111 and the polarization demodulate unit 117 are linked with single PMF, respectively. The multi-channel optical switch 112 and the measurement computer 18, the polarization demodulate unit 117 and the signal processing unit 118, and the signal processing unit 118 and the measurement computer 18 are linked with electric cable, respectively. The multi-channel optical switch 112 is controlled by the measurement computer 18 for switching optical paths to measure PMFs of the PMF stylus 114 in a time-division-multiplexing way. The incident linearly polarized light coming from the light source 110 enters into PMFs of the PMF stylus 114 though the optical circulator 111, the multi-channel optical switch 112 and the PMF pigtail bundle 113, and then the light is reflected by the spherical tip 115 of the PMF probe 116, and the reflected light as the sensing signal enters into the polarization demodulate unit 117 through the PMF pigtail bundle 113, the multi-channel optical switch 112 and the optical circulator 111. When the spherical tip 115 of the PMF probe 116 gets contact with a micro part, the PMF probe 116 deforms and the consequent stress causes polarization property changes of PMFs of the PMF stylus 114. The polarization of the reflected light is thus changed. The polarization demodulate unit 117 detects polarization changes of the reflected light and transforms it into electric single, the electric signal is processed to achieve contact displacements $\Delta X^1$, $\Delta Y^1$ and $\Delta Z^1$ of the spherical tip 115 of the PMF probe 116 relative to its zero-force position by the signal processing unit 118, and then send to the measurement computer 18 and there linked to coordinate values X, Y, Z of the PMF probe 116 relative to the coordinate measuring instrument system 11, which are determined using the XYZ-counter 16. Coordinates of contact points can be calculated from coordinate values X, Y, Z of the PMF probe 116 relative to the coordinate measuring instrument system 11 and contact displacements $\Delta X^1$, $\Delta Y^1$ and $\Delta Z^1$ of the spherical tip 115 of the PMF probe 116 relative to its zero-force position measured directly using the probing system 19. From the values computed in this way, structure geometry of a micro part is determined.

As shown in FIG. 2, the probing system 19 can be a system which consists of a PMF probe 116, a light source 110, a double PMFs pigtail bundle 21, a polarization demodulate unit 117 and a signal processing unit 118. The PMF probe 116 comprises a PMF stylus 114 and a spherical tip 115, the PMF stylus 114 consists of two PMFs, and the spherical tip 115 is fixed on one end of the PMF stylus 114. The double PMFs pigtail bundle 21 consists of an incident PMF 22 and an effluent PMF 23. The double PMFs pigtail bundle 21 is linked to the PMF stylus 114 of the PMF probe 116 in one end, and in the other end, the incident PMF 22 is connected with the light source 110 and the effluent PMF 23 is connected with the polarization demodulate unit 117. The polarization demodulate unit 117 and the signal processing unit 118, and the signal processing unit 118 and the measurement computer 18 are linked with electric cable, respectively. The incident linearly polarized light coming from the light source 110 enters into PMFs of the PMF stylus 114 though the incident PMF 22 of the double PMFs pigtail bundle 21, and then the light is reflected by the spherical tip 115 of the PMF probe 116, and the reflected light as the sensing signal enters the polarization demodulate unit 117 through the effluent PMF 23 of the double PMFs pigtail bundle 21. When the spherical tip 115 of the PMF probe 116 gets contact with a micro part, the PMF probe 116 deforms and the consequent stress causes polarization property changes of PMFs of the PMF stylus 114. The polarization of the reflected light is thus changed. The polarization demodulate unit 117 detects polarization changes of the reflected light and transforms it into electric single, the electric signal is processed to achieve contact displacements $\Delta X^1$, $\Delta Y^1$ and $\Delta Z^1$ of the spherical tip 115 of the PMF probe 116 relative to its zero-force position by the signal processing unit 118, and then send to the measurement computer 18 and there linked to coordinate values X, Y, Z of the PMF probe 116 relative to the coordinate measuring instrument system 11, which are determined using the XYZ-counter 16. Coordinates of contact points can be calculated from coordinate values X, Y, Z of the PMF probe 116 relative to the coordinate measuring instrument system 11 and contact displacements $\Delta X^1$, $\Delta Y^1$ and $\Delta Z^1$ of the spherical tip 115 of the PMF probe 116 relative to its zero-force position measured directly using the probing system 19. From the values computed in this way, structure geometry of a micro part is determined.

Figure 3:
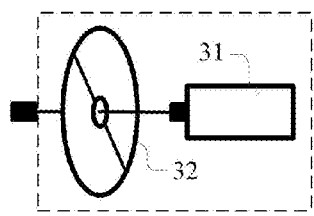
FIG. 3 is schematic illustration of the light source.

As shown in FIG. 3, the light source 110 is an adjustable linear polarization laser which consists of a laser source 31 and a rotating linear polarizer module 32. A linearly polarized light in any direction can be achieved by adjusting the polarization direction of the rotating linear polarizer module 32. The polarization direction of the linearly polarized light is aligned to the angular bisector of the fast axis and slow axis, or the fast axis, or the slow axis, or a particular direction of PMFs of the PMF stylus 114.

Figure 4:
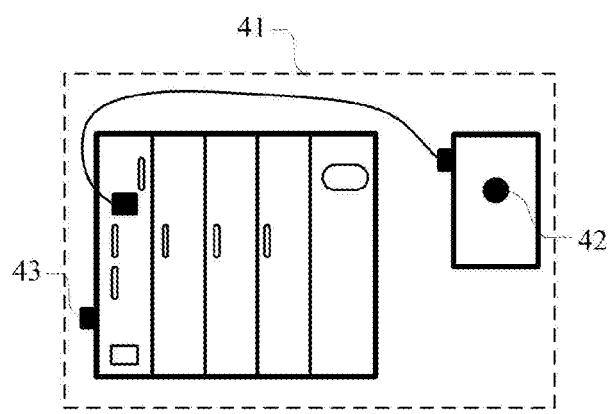
FIG. 4 is schematic illustration of the polarimeter.

The polarization demodulate unit 117 can be realized in two ways:

As shown in FIG. 4, the polarization demodulate unit 117 can be a polarimeter 41 which has an optical input port 42 and an electric output port 43. The polarmeter 41 can analysis the polarization changes of the light reflected by the spherical tip 115 of the PMF probe 116.

Figure 5:
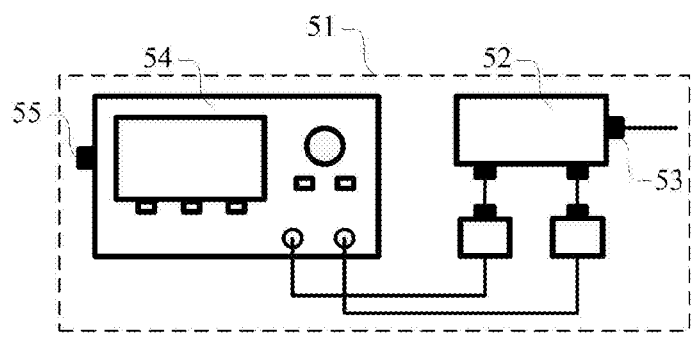
FIG. 5 is schematic illustration of the power detecting unit.

As shown in FIG. 5, the polarization demodulate unit 117 can also be a power detecting unit 51 which consists of a polarization beam splitter 52 with an optical input port 53 and a multi-channel optical power measuring device 54 with an electric output port 55. The light reflected by the spherical tip 115 of the PMF probe 116 enters into the polarization demodulate unit 117 through the optical input port 53 of the polarization beam splitter 52, and lights of the fast axis and slow axis of PMFs of the PMF stylus 114 are separated by the polarization beam splitter 52 and then received by the multi-channel optical power measuring device 54. The polarization changes of the reflected light can thus be transformed into changes of the optical power detected by the power detecting unit 51.

When the PMF probe 116 is fixed on the sleeve 13 of the coordinate measuring instrument system 11, the coordinate systems of the PMF stylus 114 and the coordinate measuring instrument system 11 can be arranged in the following way: the horizontal axis of the PMF stylus 114 of the PMF probe 116 is align to the X-axis, the vertical axis of the PMF stylus 114 is align to the Y-axis, the axial direction along the PMF stylus 114 is align to the Z-axis, and the origin point of horizontal and vertical axes coincides with the origin of X- and Y-axes.

The arrangement of PMFs of the PMF stylus 114 is of particular design, and fixed by adhesive. The spherical tip 115 which is fabricated by electric discharge machining, oxy-hydrogen flame machining or micro ball assembly technique, is fixed on one end of the PMF stylus 114 of the PMF probe 116. The diameter of PMFs used to fabricate the PMF stylus 114 is 80~125 μm, the diameter of the PMF stylus 114 is 80 μm~600 μm, the diameter ratio of the spherical tip 115 to the PMF stylus 114 is normally 1.2~1.5, the PMF stylus 114 can be 3~10 mm long.

Figure 6:
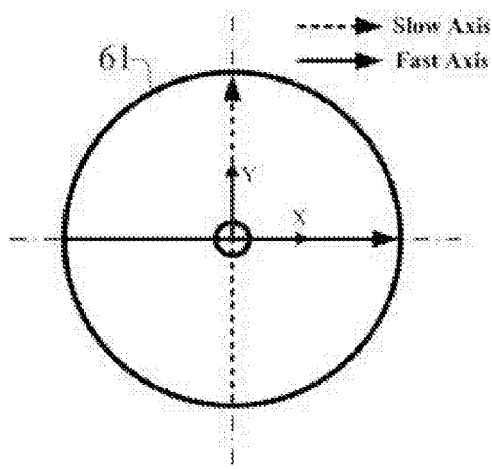
FIG. 6 is cross-sectional view of the single PMF.

The PMF probe 116 can be realized in way 1:

As shown in FIG. 6, the PMF stylus 114 can be a section of single PMF 61. The core of the PMF 61 that is the center of the PMF stylus 114 coincides with the origin point of horizontal and vertical axes. The fast axis of the PMF 61 is synclastic with the positive direction of the horizontal axis. The PMF stylus 114 and the spherical tip 115 fixed on its free end are served as the PMF probe 116. In this situation, the PMF pigtail bundle 113 is a single PMF, and it is linked to the multi-channel optical switch 112 in one end, and connected to the PMF stylus 114 in the other end.

Figure 7:
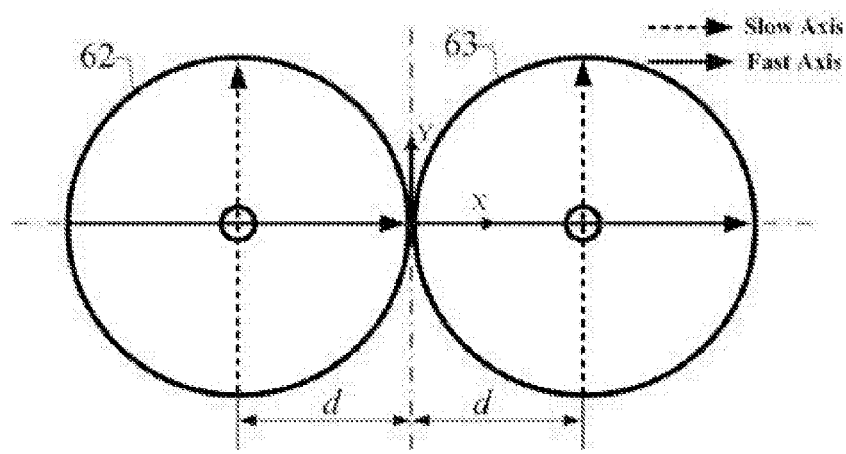
FIG. 7 is cross-sectional view of the dual-synclastic-PMFs.

The PMF probe 116 can be realized in way 2:

As shown in FIG. 7, the PMF stylus 114 can be a section of dual-synclastic-PMFs which consists of the first PMF 62 and the second PMF 63. The center of the PMF stylus 114 coincides with the origin point of horizontal and vertical axes. The core of the first PMF 62 and the core of the second PMF 63 are located on the negative and positive direction of the horizontal axis with a distance of d to the origin point of horizontal and vertical axes. The fast axes of the first PMF 62 and the second PMF 63 are synclastic with the positive direction of the horizontal axis. The PMF stylus 114 and the spherical tip 115 fixed on its free end are served as the PMF probe 116.

Figure 8:
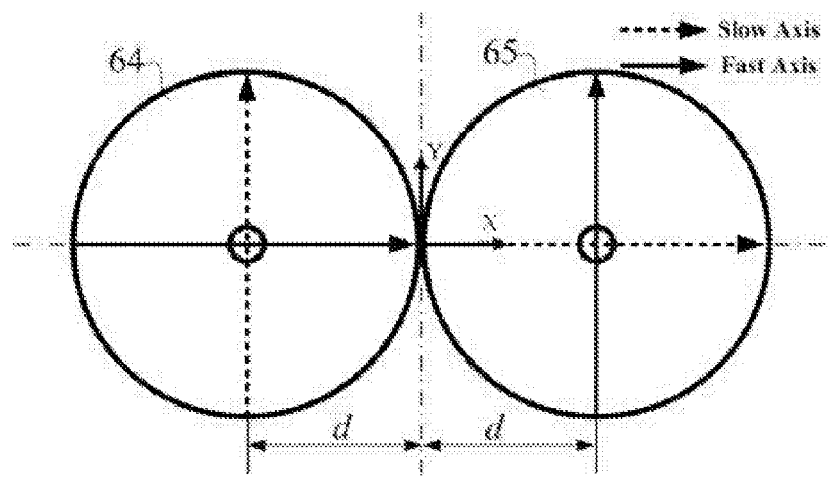
FIG. 8 is cross-sectional view of the dual-orthometric-PMFs.

The PMF probe 116 can be realized in way 3:

As shown in FIG. 8, the PMF stylus 114 can be a section of dual-orthometric-PMFs which consists of the first PMF 64 and the second PMF 65. The center of the PMF stylus 114 coincides with the origin point of horizontal and vertical axes. The cores of the first PMF 64 and the second PMF 65 are located on the negative and positive direction of the horizontal axis with a distance of d to the origin point of horizontal and vertical axes. The fast axis of the first PMF 64 and the slow axis of the second PMF 65 are synclastic with the positive direction of the horizontal axis. The PMF stylus 114 and the spherical tip 115 fixed on its free end are served as the PMF probe 116.

In the situation of way 2 and 3, the probing system can be configured as followings: the PMF pigtail bundle 113 consists of two PMFs, and it is linked to the multi-channel optical switch 112 in one end, and connected to the PMF stylus 114 in the other end.

The probing system can also be configured as followings: the double PMFs pigtail bundle 21 consists of an incident PMF 22 and an effluent PMF 23; the double PMFs pigtail bundle 21 is linked to the PMF stylus 114 in one end, and in the other end, the incident PMF 22 and the effluent PMF 23 is connected with the light source 110 and the polarization demodulate unit 117, respectively.

Figure 9:
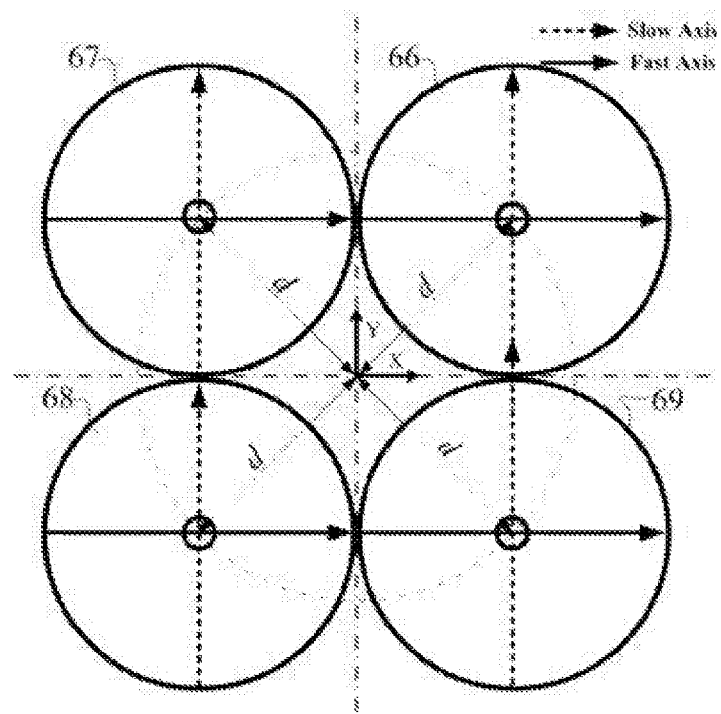
FIG. 9 is cross-sectional view of the square-synclastic-PMFs.

The PMF probe 116 can be realized in way 4:

As shown in FIG. 9, the PMF stylus 114 can be a section of square-synclastic-PMFs which consists of the first PMF 66, the second PMF 67, the third PMF 68 and the fourth PMF 69. The center of the PMF stylus 114 coincides with the origin point of horizontal and vertical axes. The cores of the first PMF 66, the second PMF 67, the third PMF 68 and the fourth PMF 69 are located out the center of the PMF stylus 114 with a distance of d to its center, and the lines from the first PMF 66, the second PMF 67, the third PMF 68 and the fourth PMF 69 to the center of the PMF stylus 114 are inclined with an angle of 45°, 135°, 225° and 315° to the positive direction of the horizontal axis, respectively. The fast axes of the first PMF 66, the second PMF 67, the third PMF 68 and the fourth PMF 69 are synclastic with the positive direction of the horizontal axis. The PMF stylus 114 and the spherical tip 115 fixed on its free end are served as the PMF probe 116.

Figure 10:
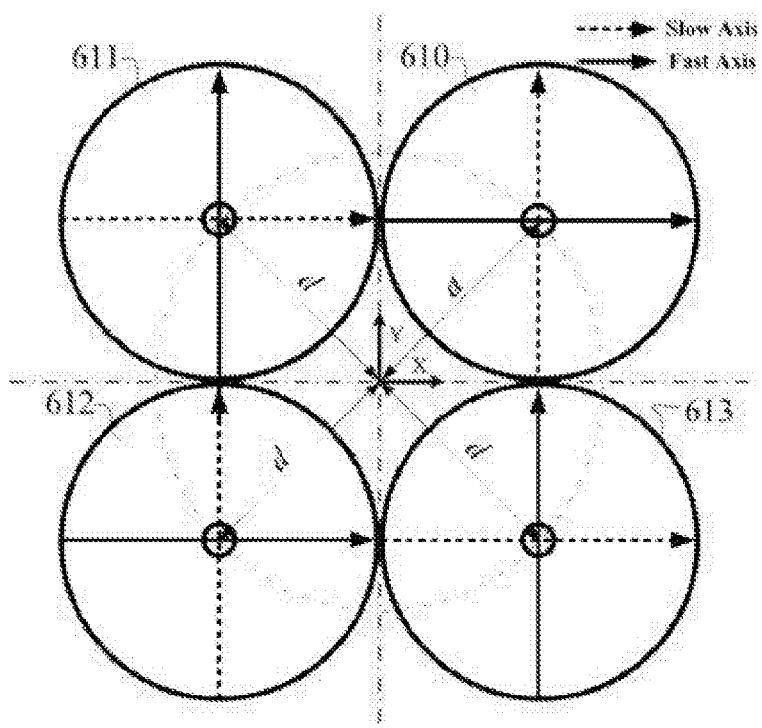
FIG. 10 is cross-sectional view of the square-orthometric-PMFs.

The PMF probe 116 can be realized in way 5:

As shown in FIG. 10, the PMF stylus 114 can be a section of square-orthometric-PMFs which consists of the first PMF 610, the second PMF 611, the third PMF 612 and the fourth PMF 613. The center of the PMF stylus 114 coincides with the origin point of horizontal and vertical axes. The cores of the first PMF 610, the second PMF 611, the third PMF 612 and the fourth PMF 613 are located out the center of the PMF stylus 114 with a distance of d to its center, and the lines from the first PMF 610, the second PMF 611, the third PMF 612 and the fourth PMF 613 to the center of the PMF stylus 114 are inclined with an angle of 45°, 135°, 225° and 315° to the positive direction of the horizontal axis, respectively. The fast axis of the first PMF 610, the slow axis of the second PMF 611, the fast axis of the third PMF 612 and the slow axis of the fourth PMF 613 are synclastic with the positive direction of the horizontal axis. The PMF stylus 114 and the spherical tip 115 fixed on its free end are served as the PMF probe 116.

Figure 11:
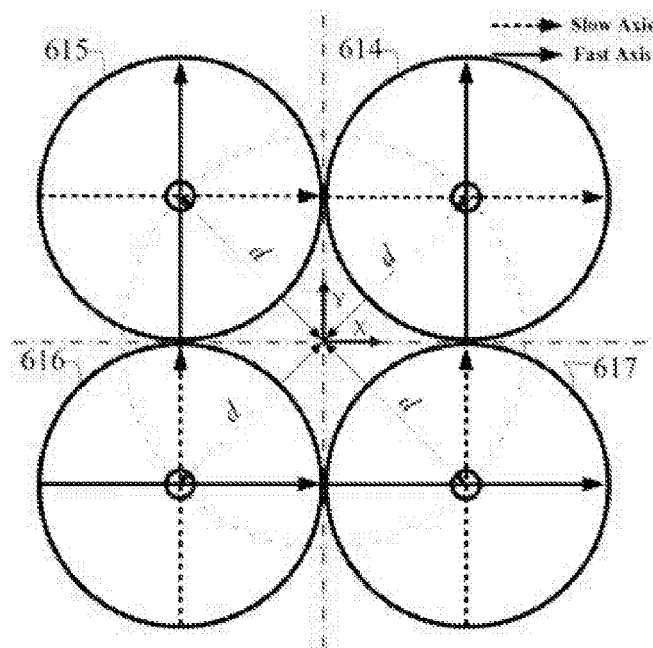
FIG. 11 is cross-sectional view of the square-semi-synclastic-PMFs.

The PMF probe 116 can be realized in way 6:

As shown in FIG. 11, the PMF stylus 114 can be a section of square-semi-synclastic-PMFs which consists of the first PMF 614, the second PMF 615, the third PMF 616 and the fourth PMF 617. The center of the PMF stylus 114 coincides with the origin point of horizontal and vertical axes. The cores of the first PMF 614, the second PMF 615, the third PMF 616 and the fourth PMF 617 are located out the center of the PMF stylus 114 with a distance of d to its center, and the lines from the first PMF 614, the second PMF 615, the third PMF 616 and the fourth PMF 617 to the center of the PMF stylus 114 are inclined with an angle of 45°, 135°, 225° and 315° to the positive direction of the horizontal axis, respectively. The slow axes of the first PMF 614 and the second PMF 615, the fast axes of the third PMF 616 and the fourth PMF 617 are synclastic with the positive direction of the horizontal axis. The PMF stylus 114 and the spherical tip 115 fixed on its free end are served as the PMF probe 116.

Figure 12:
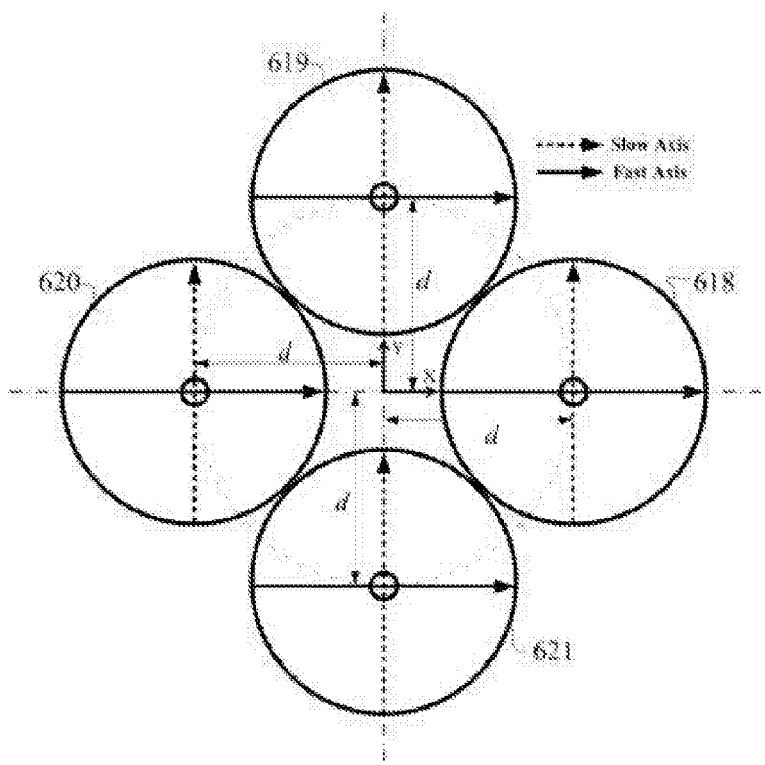
FIG. 12 is cross-sectional view of the rhombic-synclastic-PMFs.

The PMF probe 116 can be realized in way 7:

As shown in FIG. 12, the PMF stylus 114 can be a section of rhombic-synclastic-PMFs which consists of the first PMF 618, the second PMF 619, the third PMF 620 and the fourth PMF 621. The center of the PMF stylus 114 coincides with the origin point of horizontal and vertical axes. The cores of the first PMF 618, the second PMF 619, the third PMF 620 and the fourth PMF 621 are located out the center of the PMF stylus 114 with a distance of d to its center, and the lines from the first PMF 618, the second PMF 619, the third PMF 620 and the fourth PMF 621 to the center of the PMF stylus 114 are inclined with an angle of 0°, 90°, 180° and 270° to the positive direction of the horizontal axis, respectively. The fast axes of the first PMF 618, the second PMF 619, the third PMF 620 and the fourth PMF 621 are synclastic with the positive direction of the horizontal axis. The PMF stylus 114 and the spherical tip 115 fixed on its free end are served as the PMF probe 116.

Figure 13:
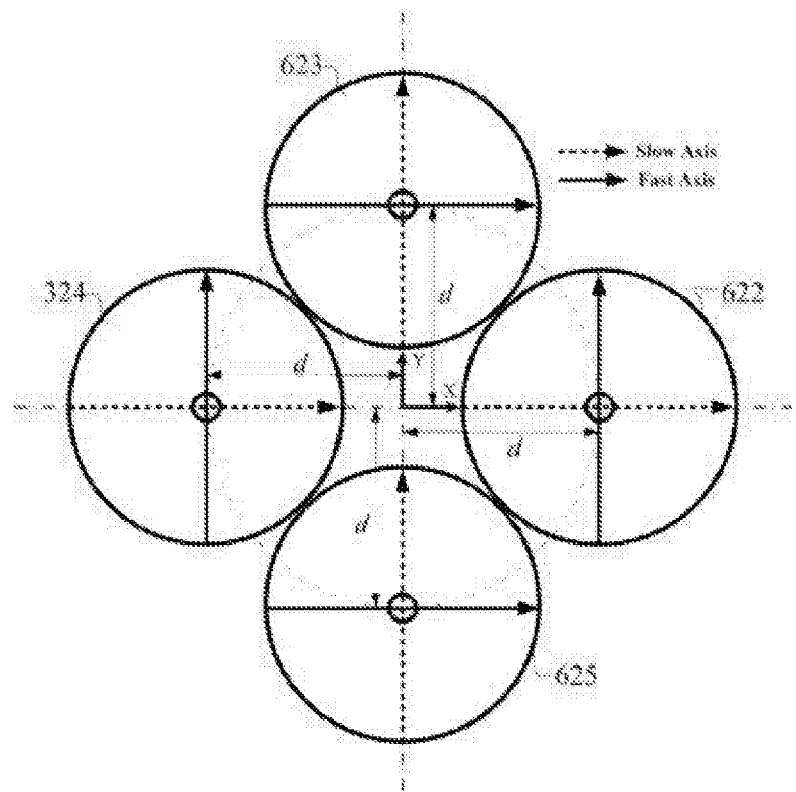
FIG. 13 is cross-sectional view of the rhombic-orthometric-PMFs.

The PMF probe 116 can be realized in way 8:

As shown in FIG. 13, the PMF stylus 114 can be a section of rhombic-orthometric-PMFs which consists of the first PMF 622, the second PMF 623, the third PMF 624 and the fourth PMF 625. The center of the PMF stylus 114 coincides with the origin point of horizontal and vertical axes. The cores of the first PMF 622, the second PMF 623, the third PMF 624 and the fourth PMF 625 are located out the center of the PMF stylus 114 with a distance of d to its center, and the lines from the first PMF 622, the second PMF 623, the third PMF 624 and the fourth PMF 625 to the center of the PMF stylus 114 are inclined with an angle of 0°, 90°, 180° and 270° to the positive direction of the horizontal axis, respectively. The slow axis of the first PMF 622, the fast axis of the second PMF 623, the slow axis of the third PMF 624 and the fast axis of the fourth PMF 625 are synclastic with the positive direction of the horizontal axis. The PMF stylus 114 and the spherical tip 115 fixed on its free end are served as the PMF probe 116.

Figure 14:
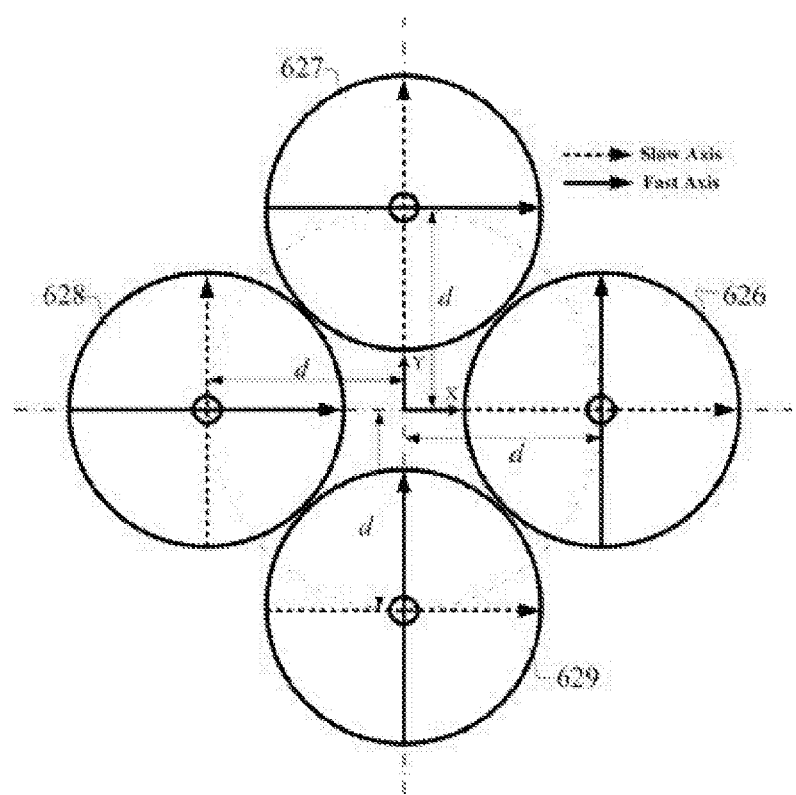
FIG. 14 is cross-sectional view of the rhombic-semi-synclastic-PMFs.
Figure 15:
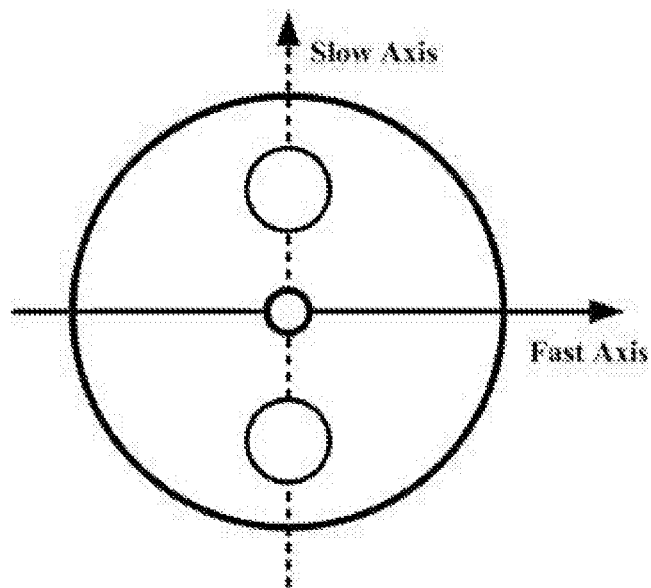
FIG. 15 is schematic illustration of the "Panda" style PMF.
Figure 16:
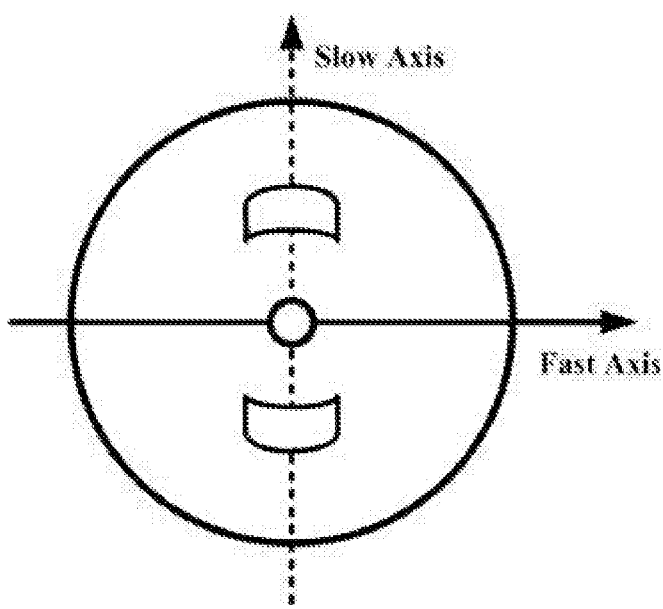
FIG. 16 is schematic illustration of the "Bow-Tie" style PMF.
Figure 17:
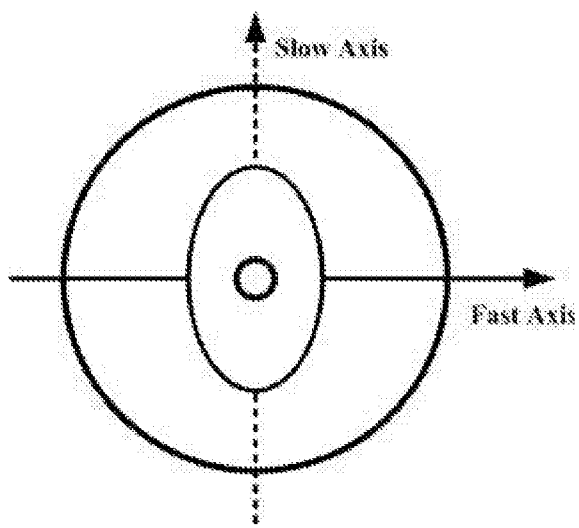
FIG. 17 is schematic illustration of the elliptical-clad style PMF.
Figure 18:
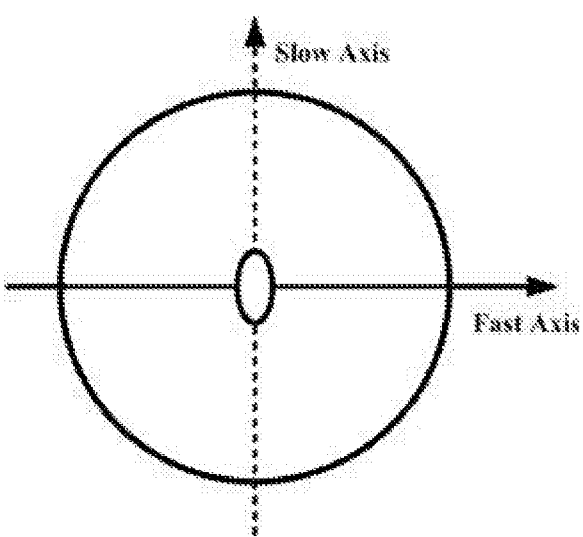
FIG. 18 is schematic illustration of the elliptical-core style PMF.

The PMF probe 116 can be realized in way 9:

As shown in FIG. 14, the PMF stylus 114 can be a section of rhombic-semi-synclastic-PMFs which consists of the first PMF 626, the second PMF 627, the third PMF 628 and the fourth PMF 629. The center of the PMF stylus 114 coincides with the origin point of horizontal and vertical axes. The cores of the first PMF 626, the second PMF 627, the third PMF 628 and the fourth PMF 629 are located out the center of the PMF stylus 114 with a distance of d to its center, and the lines from the first PMF 626, the second PMF 627, the third PMF 628 and the fourth PMF 629 to the center of the PMF stylus 114 are inclined with an angle of 0°, 90°, 180° and 270° to the positive direction of the horizontal axis, respectively. The slow axis of the first PMF 626, the fast axis of the second PMF 627, the fast axis of the third PMF 628 and the slow axis of the fourth PMF 629 are synclastic with the positive direction of the horizontal axis. The PMF stylus 114 and the spherical tip 115 fixed on its free end are served as the PMF probe 116.

In the situation of way 4~9, the PMF pigtail bundle 113 consists of four PMFs, and it is linked to the multi-channel optical switch 112 in one end, and connected to the PMF stylus 114 in the other end.

As shown in FIG. 15~18, the PMF can be a "Panda" style PMF, or a "Bow-Tie" style PMF, or an elliptical-clad style PMF, or an elliptical-core style PMF.

When the spherical tip 115 of the PMF probe 116 gets contact with a micro part in the X direction, the PMF probe 116 deforms and the PMF stylus 114 is subjected to a relevant stress caused by the radial contact displacement of the spherical tip 115 in the X direction. This stress induces refractive index changes of the fast axis and slow axis of PMFs of the PMF stylus 114, and this means changes of transmission constants of two orthogonal polarization modes propagating in PMFs of the PMF stylus 114. The changes of transmission constants break the polarization maintaining property of PMFs of the PMF stylus 114 and cause energy exchanges and phase changes between the two orthogonal polarization modes propagating in PMFs of the PMF stylus 114. The light signal launching from the light source 110 and passing through PMFs of the PMF stylus 114 is received by the polarization demodulate unit 117. By demodulating changes of the ellipticity of the reflected light through the polarimeter 41, or changes of the optical power of lights separated by the polarization beam splitter 52 through the multi-channel optical power measuring device 54, radial contact displacements of the spherical tip 115 of the PMF probe 116 in the X direction relative to its zero-force position can be calculated.

In the same way, when the spherical tip 115 of the PMF probe 116 gets contact with a micro part in the Y direction or other radial direction which can be decomposed into components in X and Y directions, radial contact displacements of the spherical tip 115 of the PMF probe 116 relative to its zero-force position can be calculated.

When the spherical tip 115 of the PMF probe 116 gets contact with a micro part in the Z direction, the PMF probe 116 is compressed and the PMF stylus 114 is subjected to an axial stress caused by the axial contact displacement of the spherical tip 115 in the Z direction, the refractive indices of the fast axis and slow axis of PMFs of the PMF stylus 114 and propagation length of the incident linearly polarized light in PMFs of the PMF stylus 114 both change accordingly, and this means that the equivalent optical path length of the incident linearly polarized light changes. The changes of transmission constants of two orthogonal polarization modes propagating in PMFs of the PMF stylus 114 caused by the refractive index changes are in common-mode, so no energy exchange between these two orthogonal polarization modes occur, but phase between these two orthogonal polarization modes changes. The light signal launching from the light source 110 and passing through PMFs of the PMF stylus 114 is received by the polarization demodulate unit 117. By demodulating changes of the azimuth of the reflected light through the polarimeter 41 and eliminating the changes of the azimuth caused by radial contact displacements, axial contact displacements of the spherical tip 115 of the PMF probe 116 in the Z direction relative to its zero-force position can be calculated.

The invention claimed is:

1. A method based on detecting the polarization property of a polarization maintaining fiber (PMF) probe for measuring structures of a micro part comprising:
   providing a PMF probe, which comprises a spherical tip and a PMF stylus;
      wherein the PMF stylus is cantilevered at one end and with the spherical tip fixed on the other end; and
      wherein the PMF stylus of the PMF probe contains one or more PMFs;
   providing a probing system, which comprises the PMF probe, an optical path, a polarization demodulate unit and a signal processing unit;
      wherein when a micro part is measured, the spherical tip of the PMF probe is brought into contact with the micro part and the polarization maintaining property of PMFs of the PMF stylus change accordingly;
      wherein the optical path supplies the PMF probe with energy and ensures the sensing signal containing polarization property changes of PMFs of the PMF stylus can reach the polarization demodulate unit; and
      wherein the polarization demodulate unit and the signal processing unit detects and processes the sensing signal, transforms it into polarization property changes of PMFs of the PMF stylus, and then calculates contact displacements of the spherical tip of the PMF probe relative to its zero-force position;
   combining the probing system with a coordinate measuring instrument system to form an equipment based on detecting the polarization property of a PMF probe for measuring structures of a micro part, contact displacements of the spherical tip of the PMF probe and coordinates of the PMF probe relative to the coordinate measuring instrument system are acquired in real time and are processed by a measurement computer;
      wherein coordinates of contact points can be calculated from coordinates of the PMF probe relative to the coordinate measuring instrument system and contact displacements of the spherical tip of the PMF probe relative to its zero-force position measured directly using the probing system;
   fastening a micro part being measured to the measurement table of the equipment based on detecting the polarization property of a PMF probe for measuring structures of a micro part;
      wherein the motion of the measurement table and the PMF probe fixed on the sleeve of the equipment is controlled by manual operation or a measurement program;
      wherein relative motion between the PMF probe and a micro part occurs and the motion track is accurately designed to bring the spherical tip of the PMF probe into contact with a certain point of a micro part; and
      wherein coordinates of the contact points can be calculated in the measurement computer; and
   obtaining coordinates of additional contact points and the structure geometry of a micro part being measured can be reconstructed from coordinates of the additional contact points.

2. Equipment based on detecting the polarization property of a PMF probe for measuring structures of a micro part comprising:
   a probing system comprising:
      a PMF probe for sensing contact displacements comprising a PMF stylus made of one or more PMFs and a spherical tip fixed on one end of the PMF stylus;
      a light source for supplying light energy for the PMF probe;
      an optical circulator;
      a multi-channel optical switch for switching optical paths to measure PMFs of the PMF stylus in a time-division-multiplexing way;
      a PMF pigtail bundle for connecting the multi-channel optical switch with the PMF stylus comprising one or more PMFs and the quantity of the PMFs is determined by that of the PMF stylus;
      a polarization demodulate unit for detecting polarization changes of the reflected light and transforming it into electric single;
      a signal processing unit for processing electric signal and calculating contact displacements $\Delta X^1$, $\Delta Y^1$ and $\Delta Z^1$ of the spherical tip of the PMF probe relative to its zero-force position;
      wherein, the probing system makes the PMF probe working, demodulates the sensing signal and extracts contact displacements $\Delta X^1$, $\Delta Y^1$ and $\Delta Z^1$ of the spherical tip of the PMF probe relative to its zero-force position, and the light source and optical circulator, the optical circulator and multi-channel optical switch, the optical circulator and the polarization demodulate unit are linked with single PMF, respectively; and
      wherein the multi-channel optical switch and the PMF stylus of the PMF probe are linked with the PMF pigtail bundle; the polarization demodulate unit and the signal processing unit are linked with electric cable;
   a coordinate measuring instrument system comprising:
      a crosspiece;
      a sleeve adjustable in the X and Z direction with the PMF probe fixed on it;
      a measurement table movable in the Y direction with a micro part being measured fastened to it for motion in Y-axis;
      an instrument basement for supporting and driving the sleeve and the measurement table;
      a XYZ-counter for determining coordinate values X, Y, Z of the coordinate measuring instrument system;
      a Computer Numerical Control (CNC) controller for controlling the motion of the sleeve and the measurement table;
      wherein, the coordinate measuring instrument system is controlled by the CNC controller to implement the whole measuring process, and accurate coordinates of PMF probe relative to the coordinate measuring instrument system are determined by the CNC controller;
      wherein the sleeve and crosspiece, the crosspiece and instrument basement, the measurement table and instrument basement are linked with mechanical structures, respectively; and
      wherein the sleeve and XYZ-counter, the measurement table and XYZ-counter, the instrument basement and CNC controller are linked with electric cable, respectively; and
   a measurement computer which is utilized to calculate coordinates of a micro part measured using results of the coordinate measuring instrument system and the probing system, and plan the measuring process and send motion signal to the CNC controller of the coordinate measuring instrument system;

wherein, the multi-channel optical switch is controlled by the measurement computer for switching optical paths to measure PMFs of the PMF stylus in a time-division-multiplexing way; and wherein the XYZ-counter and the measurement computer, and the CNC controller and the measurement computer, the multi-channel optical switch and the measurement computer, and the signal processing unit and the measurement computer are linked with electric cable, respectively.

3. The equipment according to claim 2, wherein the light source is an adjustable linear polarization laser comprises a laser source and a rotating linear polarizer module;

wherein a linearly polarized light in any direction can be achieved by adjusting the polarization direction of the rotating linear polarizer module; and wherein the polarization direction of the linearly polarized light of the light source is aligned to the angular bisector of the fast axis and slow axis, or the fast axis, or the slow axis, or a particular direction of PMFs of the PMF stylus.

4. The equipment according to claim 2, wherein the polarization demodulate unit is a polarimeter which has an optical input port and an electric output port.

5. The equipment according to claim 2, wherein the polarization demodulate unit is a power detecting unit comprising a polarization beam splitter with an optical input port and a multi-channel optical power measuring device with an electric output port.

6. The equipment according to claim 2, wherein the PMF stylus is a section of single PMF;

wherein the core of the PMF that is the center of the PMF stylus coincides with the origin point of horizontal and vertical axes; and wherein the fast axis of the PMF is synclastic with the positive direction of the horizontal axis.

7. The equipment according to claim 2, wherein the PMF stylus is a section of dual-synclastic-PMFs comprising a first PMF and a second PMF;

wherein the center of the PMF stylus coincides with the origin point of horizontal and vertical axes;

wherein the core of the first PMF and the core of the second PMF are located on the negative and positive direction of the horizontal axis with a distance of d to the origin point of horizontal and vertical axes; and wherein the fast axis of the first PMF and the fast axis of the second PMF are synclastic with the positive direction of the horizontal axis.

8. The equipment according to claim 2, wherein the PMF stylus is a section of dual-orthometric-PMFs comprising a first PMF and the a second PMF;

wherein the center of PMF stylus coincides with the origin point of horizontal and vertical axes; and wherein the core of the first PMF and the core of the second PMF are located on the negative and positive direction of the horizontal axis with a distance of d to the origin point of horizontal and vertical axes; the fast axis of the first PMF and the slow axis of the second PMF are synclastic with the positive direction of the horizontal axis.

9. The equipment according to claim 2, wherein the PMF stylus is a section of square-synclastic-PMFs comprising a first PMF, a second PMF, a third PMF and a fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225° and 315° to the positive direction of the horizontal axis, respectively; and wherein the fast axes of the first PMF, the second PMF, the third PMF and the fourth PMF are synclastic with the positive direction of the horizontal axis.

10. The equipment according to claim 2, wherein the PMF stylus is a section of square-orthometric-PMFs comprising a first PMF, a second PMF, a third PMF and a fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225°and 315° to the positive direction of the horizontal axis, respectively; and wherein the fast axis of the first PMF, the slow axis of the second PMF, the fast axis of the third PMF and the slow axis of the fourth PMF are synclastic with the positive direction of the horizontal axis.

11. The equipment according to claim 2, wherein the PMF stylus is a section of square-semi-synclastic-PMFs comprising a first PMF, a second PMF, a third PMF and a fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 45°, 135°, 225° and 315° to the positive direction of the horizontal axis, respectively; and wherein the slow axis of the first PMF, the slow axis of the second PMF, the fast axis of the third PMF and the fast axis of the fourth PMF are synclastic with the positive direction of the horizontal axis.

12. The equipment to claim 2, wherein the PMF stylus is a section of rhombic-synclastic-PMFs comprising a first PMF, a second PMF, a third PMF and a fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively; and wherein the fast axes of the first PMF, the second PMF, the third PMF and the fourth PMF are synclastic with the positive direction of the horizontal axis.

13. The equipment according to claim 2, wherein the PMF stylus is a section of rhombic-orthometric-PMFs comprising a first PMF, the second PMF, the third PMF and the fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively; and wherein the slow axis of the first PMF, the fast axis of the second PMF, the slow axis of the third PMF and the fast axis of the fourth PMF are synclastic with the positive direction of the horizontal axis.

14. The equipment according to claim 2, wherein the PMF stylus is a section of rhombic-semi-synclastic-PMFs comprising a first PMF, a second PMF, a third PMF and a fourth PMF;

wherein the center of the PMF stylus coincides with the origin point of horizontal and vertical axes;

wherein the cores of the first PMF, the second PMF, the third PMF and the fourth PMF are located out the center of the PMF stylus with a distance of d to its center, and the lines from the first PMF, the second PMF, the third PMF and the fourth PMF to the center of the PMF stylus are inclined with an angle of 0°, 90°, 180° and 270° to the positive direction of the horizontal axis, respectively; and wherein the slow axis of the first PMF, the fast axis of the second PMF, the fast axis of the third PMF and the slow axis of the fourth PMF are synclastic with the positive direction of the horizontal axis.

15. The equipment according to claim 2, wherein the PMF is selected from the group consisting of a "Panda" style PMF, a "Bow-Tie" style PMF, an elliptical-clad style PMF, and an elliptical-core style PMF.

16. Equipment based on detecting the polarization property of a PMF probe for measuring structures of a micro part comprising:

a probing system comprising:
a PMF probe for sensing contact displacements comprising a PMF stylus made of two PMFs and a spherical tip fixed on one end of the PMF stylus;
a light source for supplying light energy for the PMF probe;
a double PMFs pigtail bundle comprising an incident PMF and an effluent PMF;
a polarization demodulate unit for detecting polarization changes of the reflected light and transforming it into electric single; and
a signal processing unit for processing electric signal and calculating contact displacements $\Delta X^1$, $\Delta Y^1$ and $\Delta Z^1$ of the spherical tip of the PMF probe relative to its zero-force position;
wherein, the probing system makes the PMF probe working, demodulates the sensing signal and extracts contact displacements $\Delta X^1$, $\Delta Y^1$ and $\Delta Z^1$ of the spherical tip of the PMF probe relative to its zero-force position, and
wherein the double PMFs pigtail bundle is linked to the PMF stylus of the PMF probe in one end, and in the other end, the incident PMF of the double PMFs pigtail bundle is connected with the light source, and the effluent PMF of the double PMFs pigtail bundle is connected with the polarization demodulate unit; the polarization demodulate unit and the signal processing unit are linked with electric cable;

a coordinate measuring instrument system comprising:
a crosspiece;
a sleeve adjustable in the X and Z direction with the PMF probe fixed on it;
a measurement table movable in the Y direction with a micro part being measured fastened to it for motion in Y-axis;
an instrument basement for supporting and driving the sleeve and the measurement table;
a XYZ-counter for determining coordinate values X, Y, Z of the coordinate measuring instrument system; and
a Computer Numerical Control (CNC) controller for controlling the motion of the sleeve and the measurement table;
wherein, the coordinate measuring instrument system is controlled by the CNC controller to implement the whole measuring process, and accurate coordinates of PMF probe relative to the coordinate measuring instrument system are determined by the CNC controller; and
wherein the sleeve and crosspiece, the crosspiece and instrument basement, the measurement table and instrument basement are linked with mechanical structures, respectively; the sleeve and XYZ-counter, the measurement table and XYZ-counter, the instrument basement and CNC controller are linked with electric cable, respectively; and a measurement computer which is utilized to calculate coordinates of a micro part measured using results of the coordinate measuring instrument system and the probing system, and plan the measuring process and send motion signal to the CNC controller of the coordinate measuring instrument system;

wherein, the XYZ-counter and the measurement computer, and the CNC controller and the measurement computer and the signal processing unit and the measurement computer are linked with electric cable, respectively.

17. The equipment according to claim 16, wherein the light source is an adjustable linear polarization laser comprising a laser source and a rotating linear polarizer module;
wherein a linearly polarized light in any direction can be achieved by adjusting the polarization direction of the rotating linear polarizer module; and
wherein the polarization direction of the linearly polarized light of the light source is aligned to the angular bisector of the fast axis and slow axis, or the fast axis, or the slow axis, or a particular direction of PMFs of the PMF stylus.

18. The equipment according to claim 16, wherein the polarization demodulate unit can be a polarimeter which has an optical input port and an electric output port.

19. The equipment according to claim 16, wherein the polarization demodulate unit is a power detecting unit comprising a polarization beam splitter with an optical input port and a multi-channel optical power measuring device with an electric output port.

20. The equipment according to claim 16, wherein the PMF stylus is a section of dual-synclastic-PMFs comprising a first PMF and a second PMF;
wherein the center of the PMF stylus coincides with the origin point of horizontal and vertical axes;
wherein the core of the first PMF and the core of the second PMF are located on the negative and positive direction of the horizontal axis with a distance of d to the origin point of horizontal and vertical axes; and wherein the fast axis of the first PMF and the fast axis of the second PMF are synclastic with the positive direction of the horizontal axis.

21. The equipment according to claim 16, wherein the PMF stylus is a section of dual-orthometric-PMFs comprising a first PMF and a second PMF;
wherein the center of PMF stylus coincides with the origin point of horizontal and vertical axes;
wherein the core of the first PMF and the core of the second PMF are located on the negative and positive direction of the horizontal axis with a distance of d to the origin point of horizontal and vertical axes; and
wherein the fast axis of the first PMF and the slow axis of the second PMF are synclastic with the positive direction of the horizontal axis.

22. The equipment according to claim 16, wherein the PMF is selected from the group consisting of a "Panda" style PMF, a "Bow-Tie" style PMF, an elliptical-clad style PMF, and an elliptical-core style PMF.

* * * * *